United States Patent [19]
Pysnik et al.

[11] Patent Number: 5,999,583
[45] Date of Patent: *Dec. 7, 1999

[54] METHOD AND APPARATUS FOR CONTROL ROD DRIVE MECHANISM ANALYSIS USING COIL CURRENT SIGNALS

[75] Inventors: Joseph Pysnik, Monroeville; James Jerome Patnesky, Jr., Allison Park; Panfilo Augustino Federico, McKees Rocks, all of Pa.

[73] Assignee: Westinghouse Electric Company LLC, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/639,825

[22] Filed: Apr. 29, 1996

[51] Int. Cl.[6] .............................. G21C 7/14; G21C 17/00
[52] U.S. Cl. ........................ 376/228; 376/245; 324/511; 324/522
[58] Field of Search ..................... 376/245, 228, 376/259; 324/511, 522, 535; 310/19

[56] References Cited

U.S. PATENT DOCUMENTS

| | | | |
|---|---|---|---|
| 4,125,432 | 11/1978 | Brooks, Jr. et al. | 176/22 |
| 4,363,778 | 12/1982 | Abbot | 376/228 |
| 4,585,609 | 4/1986 | Rat | 376/245 |
| 4,663,576 | 5/1987 | Scarola et al. | 318/685 |
| 4,777,010 | 10/1988 | Sato | 376/228 |
| 4,961,898 | 10/1990 | Bogard et al. | 376/245 |
| 5,009,834 | 4/1991 | Tessaro | 376/232 |
| 5,066,451 | 11/1991 | Tessaro | 376/237 |
| 5,307,384 | 4/1994 | King et al. | 376/228 |
| 5,329,465 | 7/1994 | Arcella et al. | 364/551.01 |
| 5,392,321 | 2/1995 | Gaussa, Jr. et al. | 376/258 |
| 5,485,491 | 1/1996 | Salnick et al. | 376/245 |

OTHER PUBLICATIONS

Hashemian, H. M. and Fain, R. E., "Experience With Measurement of Drop Time of Control and Shutdown Rods and Testing of CRDMs in Nuclear Power Plants," pp. 259–271, 1995.

Fain, R.E., Petersen, K.M. and Hashemian, H.M., "New Equipment for Rod Drop and Control Rod Drive Mechanism Timing Tests in PWRs," pp. 371–381, 1995.

Mitsubishi Heavy Industries, Ltd., "Control Rod Drive Mechanism Data Analyzing System," 1994.

Analysis and Measurement Services Corporation Technical Bulletin No. RD9401 "Rod Drop and CRDM Tests in PWRs," 1994.

Westinghouse Electric Corporation Descriptive Bulletin Nuclear I&C No. DB21N–504 "Automatic Multiple Rod Drop Test System," 1993.

Nucl. Eng. Int., pp. 40, 41, Jul. 1982.

*Primary Examiner*—Harvey E. Behrend

[57] ABSTRACT

The electromagnetic drive mechanism for the control rods of a nuclear reactor has a stationary gripper and coil, a movable gripper and coil, and a lifting armature and coil for moving the movable gripper to advance or retract the control rods in steps. A coil current driver responsive to a controller provides currents to the coils individually and in combinations. During the operations, coil current signals are sensed, sampled, digitized and processed to generate coil current data such as amplitude as a function of time. The measured coil current data is compared to nominal current data as well as historical current data, and the historical data is updated or appended to include the measured data. The comparison includes a check for correct timing relationships, such as the timing of the current notch occurring due to increased inductance upon pull-in of a gripper. Additionally, voltages or currents between the ac power source and the coils can be monitored for isolating a failure to particular circuit elements.

7 Claims, 5 Drawing Sheets

METHOD AND APPARATUS FOR CONTROL ROD DRIVE MECHANISM ANALYSIS USING COIL CURRENT SIGNALS

BACKGROUND OF THE INVENTION

1. Field of the Invention

The invention relates to analyzing over time the performance of a control rod drive mechanism of a nuclear reactor, and its associated control system, by digitizing, storing and analyzing current level signals developed during stepwise lifting and lowering of control rods using electromagnetically driven sequential gripping and moving devices.

2. Prior Art

In a nuclear reactor for power generation, such as a pressurized water reactor, heat is generated by fission of a nuclear fuel such as enriched uranium, and transferred into a coolant flowing through a reactor core. The core contains elongated nuclear fuel rods mounted in proximity with one another on a fuel assembly structure through and over which the coolant flows. The fuel rods are spaced from one another in coextensive parallel arrays. Some of the neutrons and other atomic particles released during nuclear decay of fuel atoms in a given fuel rod pass through the spaces between fuel rods and impinge on the fissile material in an adjacent fuel rod, contributing to the nuclear reaction and to the heat generated by the core.

Movable control rods are dispersed throughout the nuclear core to enable control of the overall rate of fission, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in an adjacent fuel rod; and retracting the control rod reduces the extent of neutron absorption and increases the rate of the nuclear reaction and the power output of the core.

The control rods are supported in cluster assemblies that are movable to advance or retract a group of control rods relative to the core. For this purpose, control rod drive mechanisms are provided, typically as part of an upper internals arrangement located within the nuclear reactor vessel above the nuclear core. The reactor vessel is typically pressurized to a high internal pressure, and the control rod drive mechanisms are housed in pressure housings that are tubular extensions of the reactor pressure vessel.

One type of mechanism for positioning a control rod is a so-called magnetic jack, operable to move the control rod by an incremental distance into or out of the core in discrete steps. The control rod drive mechanism has three electromagnetic coils and armatures or plungers that are operated in a coordinated manner to raise and lower a drive rod shaft and a control rod cluster assembly coupled to the shaft. The three coils are mounted around and outside the pressure housing. Two of the three coils operate grippers that when powered by the coils engage with the drive rod shaft, one of the grippers being axially stationary and the other axially movable.

The drive rod shaft has axially spaced circumferential grooves that are clasped by grip latches on the grippers, spaced circumferentially around the drive rod shaft. The third coil actuates a lift plunger coupled between the movable gripper and a fixed point. If control power to the control rod drive mechanism is lost, the two grippers both release and the control rods drop by gravity into their maximum nuclear flux damping position. So long as control power remains activated, at least one of the stationary gripper and the movable gripper holds the drive rod shaft at all times.

The three coils are operated in a timed and coordinated manner alternately to hold and to move the drive shaft. The sequence of gripping actions and movements is different depending on whether the stepwise movement is a retraction or an advance. The stationary gripper and the movable gripper operate substantially alternately, although during the sequence of movements both grippers engage the drive shaft during a change from holding stationary to movement for advance or retraction. The stationary gripper can hold the drive shaft while the movable gripper is moved to a new position of engagement, for lowering (advancing) the drive shaft and the control rods. The movable gripper engages with the drive shaft when moving it up or down as controlled by the lift plunger. After the movable gripper engages the drive shaft, the stationary gripper is released and then the plunger is activated or deactivated to effect movement in one direction or the other. Typically, each jacking or stepping movement moves the drive rod shaft ⅝ inch (1.6 cm), and some 228 steps are taken at about 0.8 seconds per step, to move a control rod cluster over its full span of positions between the bottom and top of the fuel assembly.

More particularly, for lifting (retracting) the control rods, the following steps are accomplished in sequence, beginning with the stationary gripper engaged in a drive rod groove and the movable gripper and plunger both being deactivated:

1. the movable gripper is energized and engages a drive rod groove;
2. the stationary gripper is de-energized and disengages from the drive rod;
3. the lift coil is energized and electromagnetically lifts the movable gripper and the drive rod an elevation equal to the span of the lift plunger;
4. the stationary gripper is energized, re-engages and holds the drive rod (i.e., both grippers are engaged);
5. the movable coil is de-energized and disengages the drive rod;
6. the lift coil is de-energized, dropping the movable coil back to its start position, namely one step lower on the lifted drive rod.

Similarly, for lowering (advancing) the control rods, the following steps are accomplished in sequence, again beginning with only the stationary gripper energized:

1. the lift coil is energized, moving the movable gripper one step up along the drive rod;
2. the movable gripper coil is energized and the movable gripper grips the drive rod;
3. the stationary coil is de-energized, releasing the drive rod;
4. the lift coil is de-energized, dropping the movable coil and the drive rod by one step;
5. the stationary coil is energized and the stationary gripper engages the drive rod, at a position one step higher than its previous position; and,
6. the movable coil is de-energized and the movable gripper disengages from the drive rod.

A number of particular coil mechanisms and gripper mechanisms are possible. Examples of coil jacking mechanisms with a stationary gripper, a movable gripper and a lifting coil as described are disclosed, for example, in U.S. Pat. No. 5,307,384—King et al., U.S. Pat. No. 5,066,451—

Tessaro and U.S. Pat. No. 5,009,834—Tessaro, all of which are hereby incorporated.

Whatever mechanical arrangement is employed for the grippers and lifting coil/armature arrangement, a discrete time interval is needed to complete each sequential operation. In order to move the control rods quickly, reliably and efficiently, the respective grippers and coils must be operated accurately as to their timing. This requires that the coil energizing electric power signals to the respective coils be accurately timed.

The power level of coil energization can be simply on and off, or preferably the coils can be energized at different levels during different operations in the sequence. For example, the lift coil signal can have an intermediate or "hold" current level for the lift coil, between the de-energized (zero) level and the full-on lifting level. At the intermediate level, the lift coil maintains the position of the movable coil. An intermediate current level may also provide sufficient power to move the movable gripper when it is disengaged from the control drive rod. An intermediate current level can be used with the stationary gripper coil for holding, as opposed to a higher level for positive initial gripping.

The coil signals are switched between the levels in a coordinated manner by a logic controller. The logic controller generates timed signals to switch power regulation circuits on and off or between current levels. The timing relationships between and among current pulses applied to the stationary gripper coil, the movable gripper coil and the lift coil, are adjusted manually when setting up the control rod drive mechanism, and remain set. For example, an oscilloscope or chart recorder is set up to record the three coil currents. A timing signal at a known frequency can be provided and recorded together with the coil current signals as a reference. The actual determination of timing is done by reviewing the recorded signals and spacing the operations in time sufficiently to complete each step in the sequence before undertaking the next.

The power regulation circuits attempt to maintain the required coil currents at the required times in the sequence of operations. However, the actual coil currents have current variations that reflect the status of the electromechanical operation. For example, the drive currents to the gripper coils typically show a brief reduction or notch in current when the associated gripper fully pulls in and the inductance of the gripper coil increases. The notch disappears as the power regulator responds to bring the current level to nominal. By noting the occurrence of the notch in the gripper coil current signal, the technician can determine the point in time at which the gripper engaged. The timing of the next operation, which depends on successful gripper engagement, is then set to occur at a slight delay after the gripper engagement time noted.

Various circuit elements can be used in the control logic circuits to trigger the power regulator to generate the necessary control currents at preset times in the sequence. For example, cycles at a known frequency (such as the recorded timing reference signal) can be digitally counted, and a particular power regulation switching operation can be triggered by a signal gated from a cycle counter at a predetermined count. Alternatively, the timing can be set using other means such as adjusting the RC delays of monostable multivibrators that trigger one another in a cascade sequence. In any event, the timing is predetermined and set, giving some leeway or extra time to ensure completion of each operation before commencing the next, while nevertheless enabling the rods to be advanced or retracted relatively promptly through their span of movement.

It would be advantageous to provide a more automated control mechanism that is responsive to operation of the device rather than preset timings based on the expectation that current levels will be reached and mechanical actions will occur at the needed times. It would also be advantageous if the control mechanism could include ongoing diagnostic and feedback capabilities, such that deviation from expected operation can be detected by comparison with historical or nominal operation and suitable corrective action taken.

SUMMARY OF THE INVENTION

It is an object of the invention to provide a method and apparatus for automatically analyzing the current levels and timing relationships of an operating control rod drive mechanism having coordinated electromagnetic gripping and moving coils, to ensure effective operation, and to diagnose electrical and mechanical faults.

It is also an object of the invention to sample and digitize the coil current levels over time, and to automatically test for correct demanded current levels over time, and for the occurrence of current variations indicative of mechanical operations at the required times.

It is another object to monitor for problems in the power regulations circuits, such as loss of power or excessive ripple.

It is still another object to conduct such monitoring in an ongoing manner, and to store data respecting historical operations for comparison with present operations to identify differences, potential problems and trends.

It is also an object to embody a control rod drive testing unit that can be integrated with the control rod drive logic, does not require separate instrumentation wiring to the coils, and can include a control rod drop tester.

These and other objects are accomplished for an electromagnetic drive mechanism for the control rods of a nuclear reactor having a stationary gripper and coil, a movable gripper and coil, and a lifting armature and coil for moving the movable gripper to advance or retract the control rods in steps. A coil current driver responsive to a controller provides currents to the coils individually and in combinations. During the operations, coil current signals are sensed, sampled, digitized and processed to generate coil current data such as amplitude as a function of time. The measured coil current data is compared to nominal current data as well as historical current data, and the historical data is updated or appended to include the measured data. The comparison includes a check for correct timing relationships, such as the timing of the current notch occurring due to increased inductance upon pull-in of a gripper. Additionally, voltages or currents between the ac power source and the coils can be monitored for isolating a failure to particular circuit elements.

Additional objects and aspects of the invention will be apparent from the following nonlimiting description of exemplary practical embodiments.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
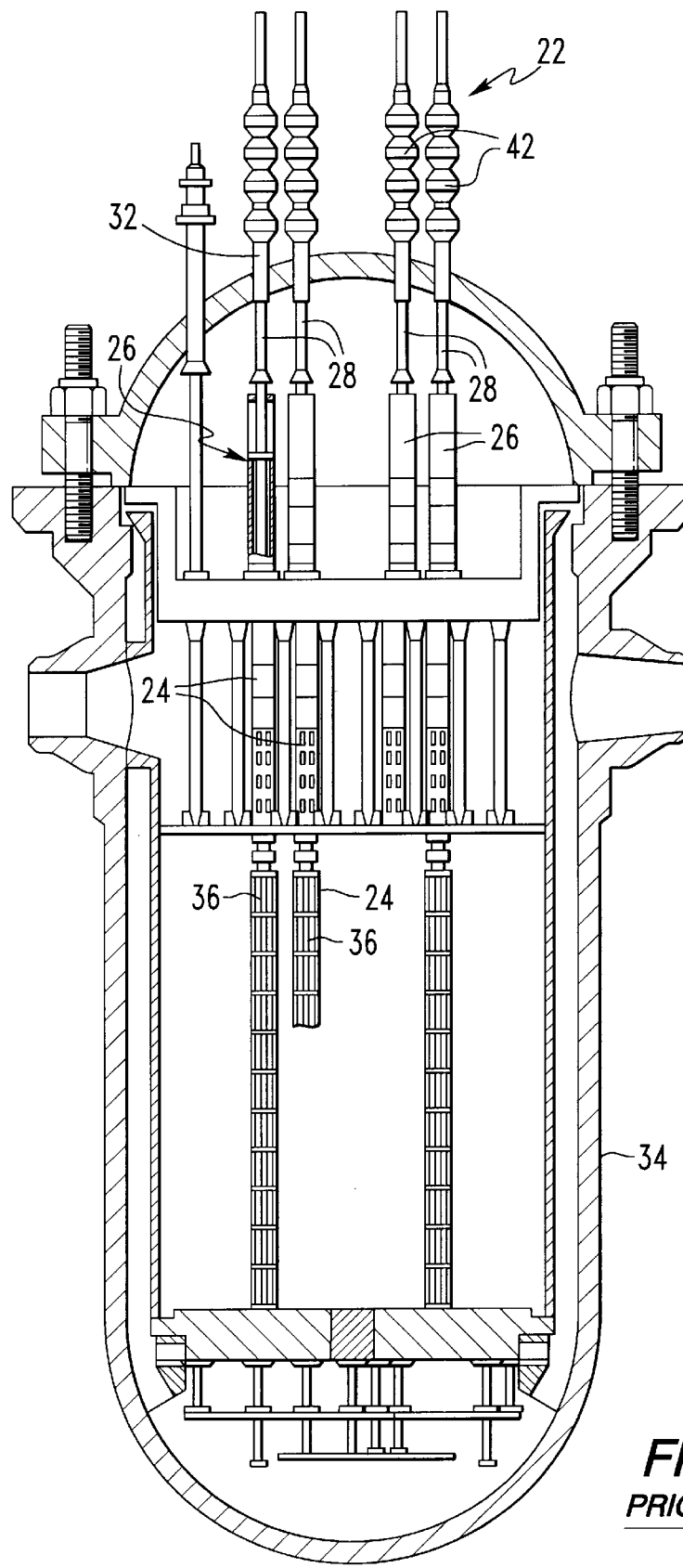
FIG. 1 is an elevation view, partly in section, showing a nuclear reactor core.

The invention provides a method for analyzing operation of an electromagnetic drive mechanism 22 for nuclear control rods 24, shown generally in FIG. 1, in a manner that permits detection of performance problems including not only failure of components, but also deterioration of performance over time. By collecting and storing data on the performance of the components and comparing present performance to previously stored historical data, the invention permits detection of impending problems before a failure actually occurs.

The control rods as shown in FIG. 1 are attached in clusters 26, each cluster being commonly driven by a drive rod 28 disposed in a vertical extension housing 32 of the reactor core pressure vessel 34 containing the fuel rod assemblies 36 into which the control rods 24 are advanced or from which the control rods are retracted for variable damping of nuclear flux. The moving parts of the mechanism are within the pressure envelope of the reactor and the electromagnetic coils 42 for driving the movable parts are disposed around and about each of the extensions.

Figure 2:
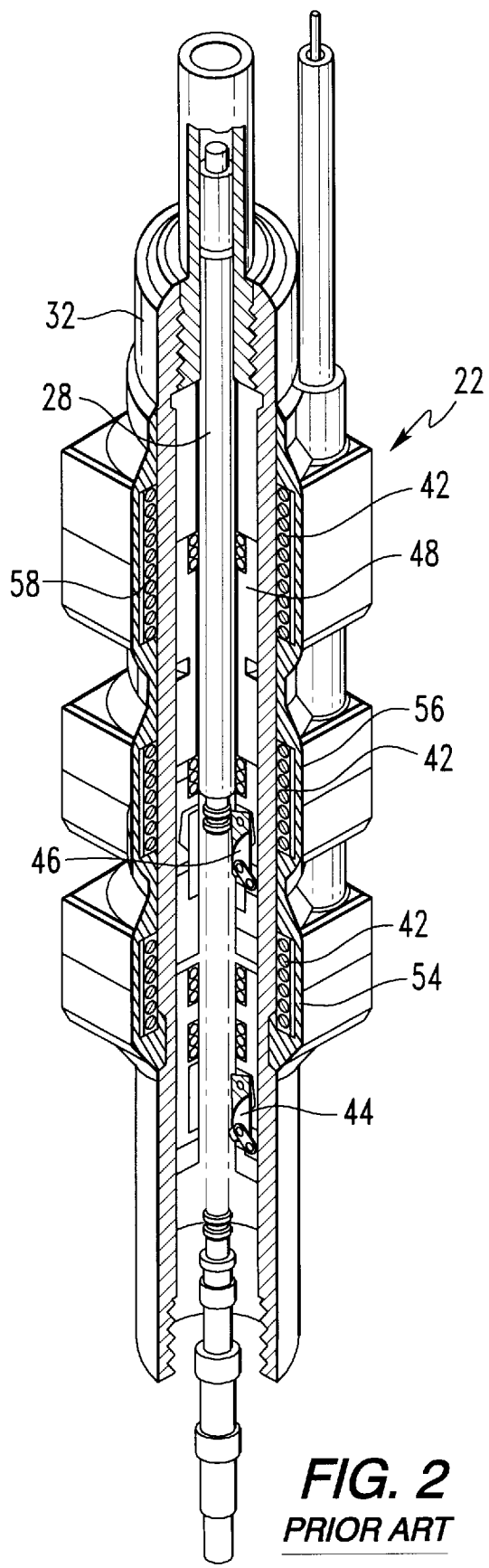
FIG. 2 is a perspective view, partly cut away, showing the stationary and movable grippers and lifting mechanism of a control rod drive mechanism.
Figure 3:
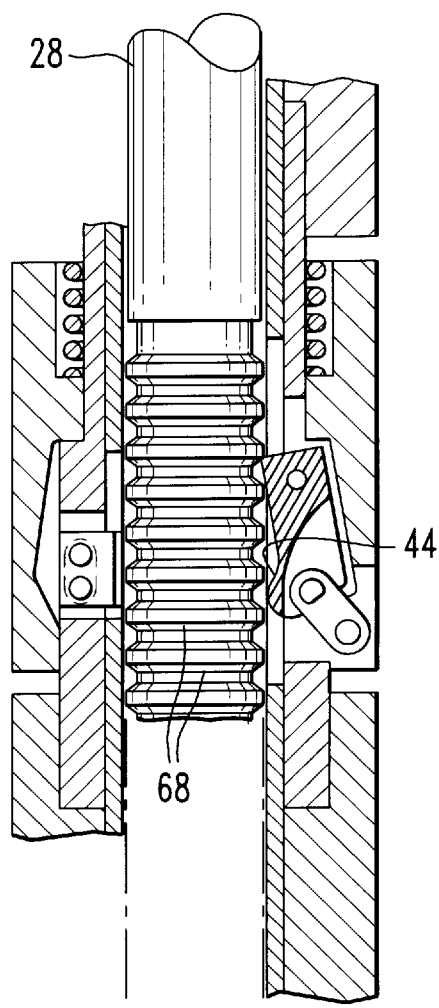
FIG. 3 is a more detailed sectional view showing exemplary stationary and movable grippers.

FIG. 2 shows one drive rod mechanism with the extension housing partly cut away, and FIG. 3 is a detailed view, partly in section, showing exemplary grippers that or operable in sequences to engage, lift and/or lower the drive rod when the associated coils of the drive mechanism are energized. This arrangement is substantially as disclosed in U.S. Pat. No. 5,009,834—Tessaro, which is hereby incorporated with respect to the mechanical and electromagnetic aspects of the control rod drive.

The drive mechanism comprises stationary grippers 44 and movable grippers 46 for engaging the drive rod 28, and a lifting armature 48 by which the movable grippers are lifted or allowed to fall along the longitudinal axis of the drive rod 28. Each is operated by a corresponding electromagnetic coil 54, 56, 58. The grippers are arranged normally to release the drive rod 28, for example being mounted to pivot clear of the drive rod or spring biased to retract, when not electromagnetically forced to engage. Thus, when neither of the stationary and movable gripper coils 54, 56 is energized, the corresponding grippers 44, 46 release their hold on the drive rod, which falls by gravity, allowing the control rods 24 to drop into the nuclear core. At other times the coils are energized for either holding drive rod 28 and the associated control rods 24 in position or for stepping them up or down in response to signals from a controller (not shown) that regulates the output level of the reactor. FIG. 3 shows an exemplary mounting of a movable gripper, in particular one of three grippers that are spaced circumferentially around drive rod 28 for bearing radially inwardly to engage ridges or grooves 68 on rod 28 or outward to clear the ridges or grooves. The same reference numbers are used throughout the drawings to identify corresponding elements.

The drive mechanism has at least one stationary gripper coil 54, at least one movable gripper coil 56, each having an independently driven gripper 44, 46, and at least one lifting armature 48 driven by a lift coil 58 for displacing the movable gripper relative to the stationary gripper. Each coil is coupled to a coil current driver controlled by a timing circuit that is wired or programmed to effect a series of switching operations for achieving coil current sequences as shown in FIG. 4 (for lowering the drive rod) and FIG. 5 (for lifting the drive rod) by one step at a time.

Figure 5:
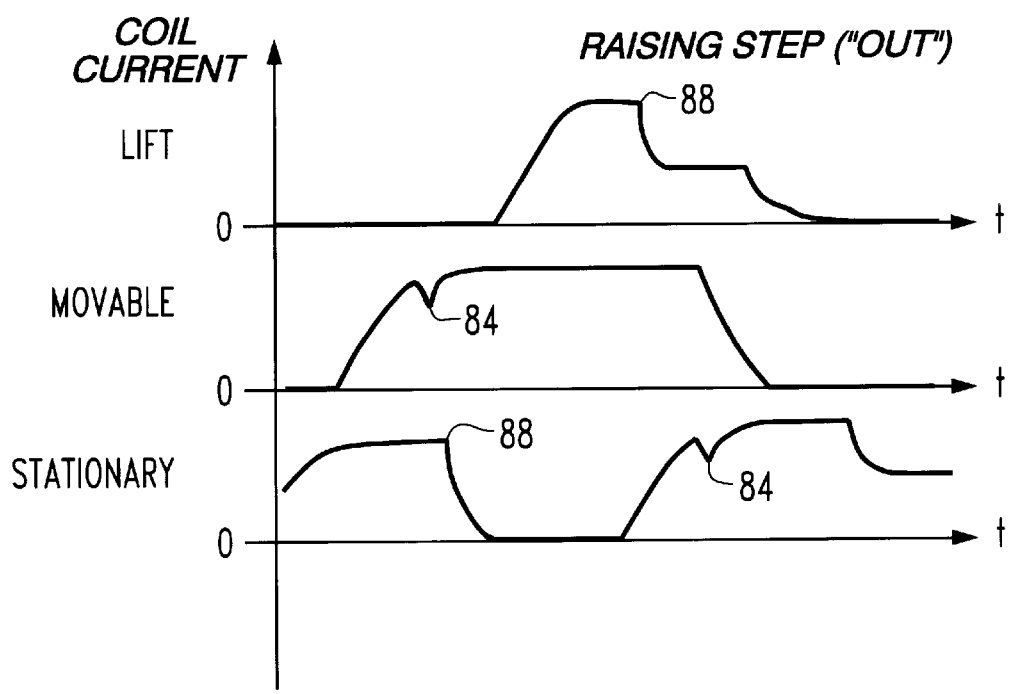
FIG. 5 is a graph of nominal coil current amplitudes as a function of time during operation of the control mechanism to step control rods outwardly (i.e., a lifting step).
Figure 6:
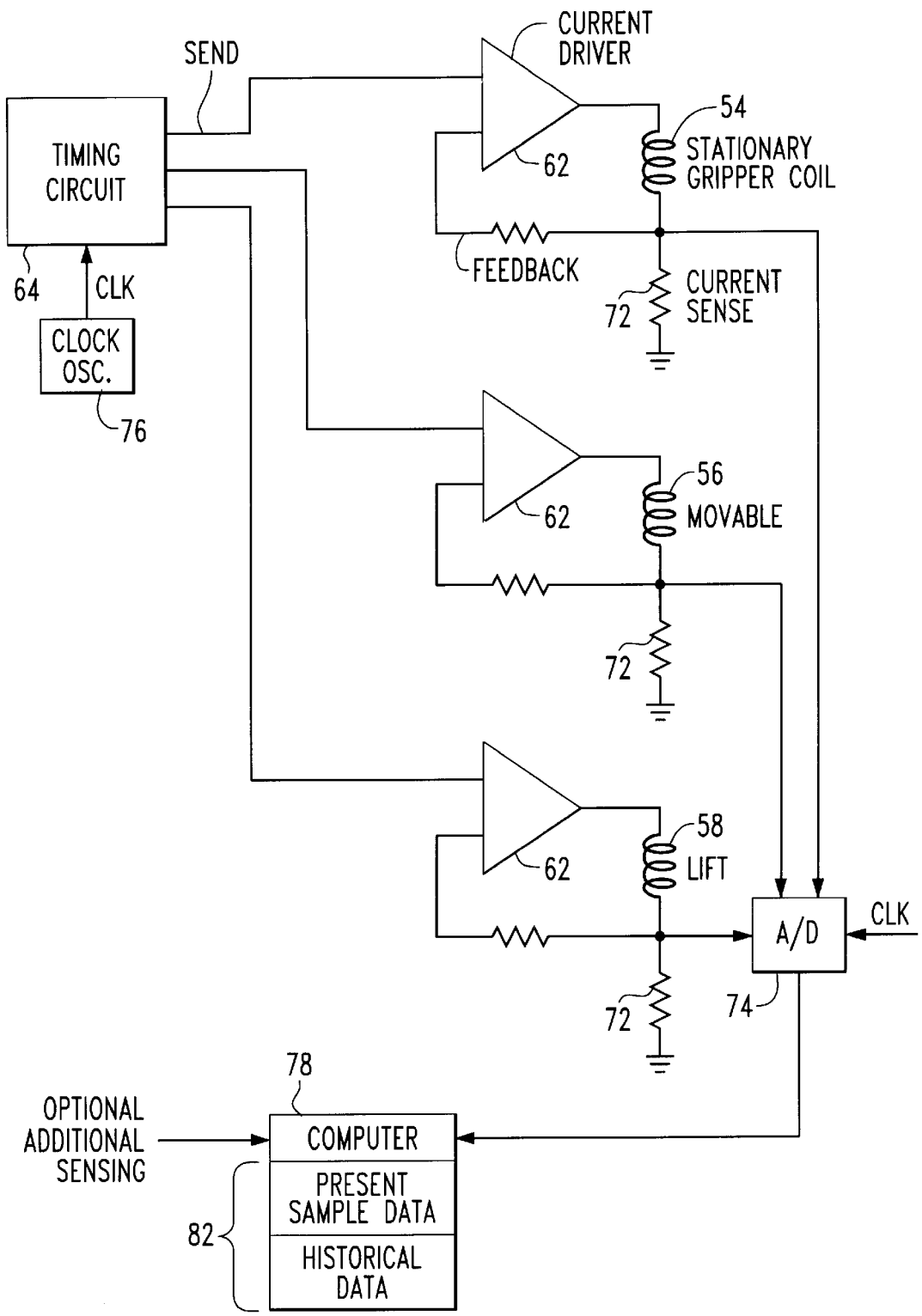
FIG. 6 is a block diagram illustrating the elements of an apparatus according to the invention.

The current drivers 62 and timing circuit 64 are shown generally in FIG. 6. Current drivers 62 provide current to coils 54, 56, 58 for effecting sequences of holding and moving operations that cause the control rod drive rod 28 to be raised or lowered by one increment during the sequences shown in FIGS. 4, and 5, each step taking about 1.7 s to complete and any number of sequences being executed one after another depending on the needs of the reactor for more or less nuclear flux. The holding and moving operations include phases in which the coils are energized individually, and other phases in which the coils are energized in combinations. The coil currents having nominal amplitudes at different times in the cycle (e.g., full-on to initially engage, part-on for holding, and off) and nominal timing relationships.

Figure 4:
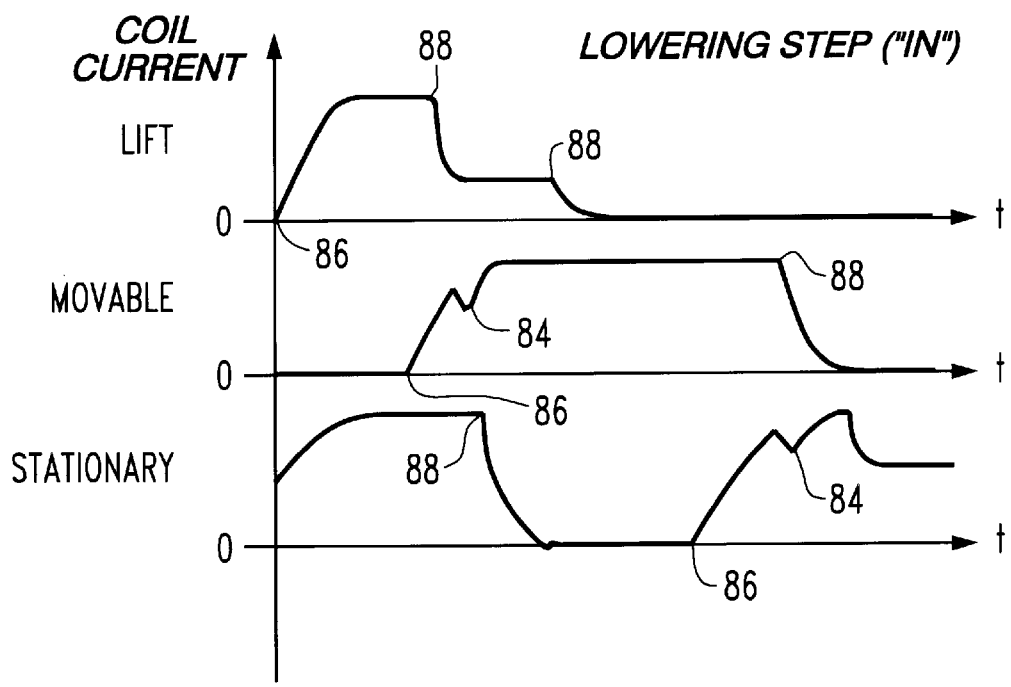
FIG. 4 is a corresponding graph of nominal coil current amplitudes during an inward step (i.e., a lowering step).

FIG. 4 is a time plot showing the nominal current levels and nominal timing relationships for steps in which drive rod 28 and associated control rods 24 are lowered or advanced into the spaces between the nuclear fuel rods in the core; and FIG. 5 represents raising or retracting control rods 24 from the core. Lifting (FIG. 5) is accomplished beginning from a situation in which stationary gripper 54 is energized for holding drive rod 28, and movable gripper 46 resides in its lower position but is disengaged from drive rod 28 because movable gripper coil 56 and lift coil 58 are both de-energized. During the raising or "out" step, movable gripper 46 is latched onto drive rod 28 by energizing movable gripper coil 56; stationary gripper coil 54 is then de-energized and stationary gripper 44 releases rod 28; lift armature 48 is operated to lift movable gripper 46 together with the drive rod by an increment equal to the armature's span of movement; stationary gripper 44 is again engaged; and finally the movable gripper coil and armature coil are de-energized, and the mechanism returns to its start position. The timing circuit 64 has suitable gating, timing and/or state circuits that move through this sequence with each step, in particular by sending a signal to the appropriate current driver(s) 62 at the appropriate times. Current drivers maintain the required coil current, for example, using a current sensing resistor 72 coupled in a feedback loop for maintaining the current level indicated by the "send" signal from the timing circuit.

Each gripper preferably comprises a plurality of circumferentially spaced toothed bodies that are brought radially inwardly by electromagnetic force to engage in annular slots or ridges 68 of the drive rod when engaging. When the respective coils are de-energized, the toothed grippers move radially outwardly to release rod 28.

For a lowering step, again starting from a time when stationary gripper 44 is holding the drive rod, the first step is to energize lift coil 58 to cause armature 48 to raise movable gripper 46 (which is de-energized at the time) to a higher point along the drive rod 28; movable gripper coil 56 is then energized and movable gripper 46 engages the drive rod while held by armature 48 at this higher point; stationary gripper 44 is released, then armature coil 58 is de-energized. The drive rod 28 and the control rods 24 coupled to it, drops by gravity as movable gripper 46 falls back to its original position. Stationary gripper 44 is then energized, and finally movable gripper 46 is de-energized to resume the situation preceding the step.

Activation and deactivation of the grippers and the armature require a discrete time interval to permit the coil current to be established or cut off or for a mechanical motion to be completed, before the next motion is commenced. The necessary times can be nominally established, allowing for a safety margin, and conventionally are programmed into timing circuit 64. However, with wear and potentially with electrical failures, the mechanism may deteriorate to the point that it cannot operate correctly or operate at nominal timing. Wear and electrical failure can cause sudden failure or operation can deteriorate over time.

According to the invention, the operational status of the control rod drive mechanism is monitored by sensing current signals in coils 54, 56, 58 during the sequence of lifting and lowering operations, and analyzing the current signals both against nominal operational thresholds and also against historical data that is accumulated, stored, and compared with data as it is collected during present operations. In this manner, the operational status of the mechanism can be assessed, and impending failure modes can be identified or even predicted. The invention thus provides ongoing diagnostic checking as well as data that can be used, for example over a plant-wide network, for assessing and planning maintenance and engineering.

Figure 7:
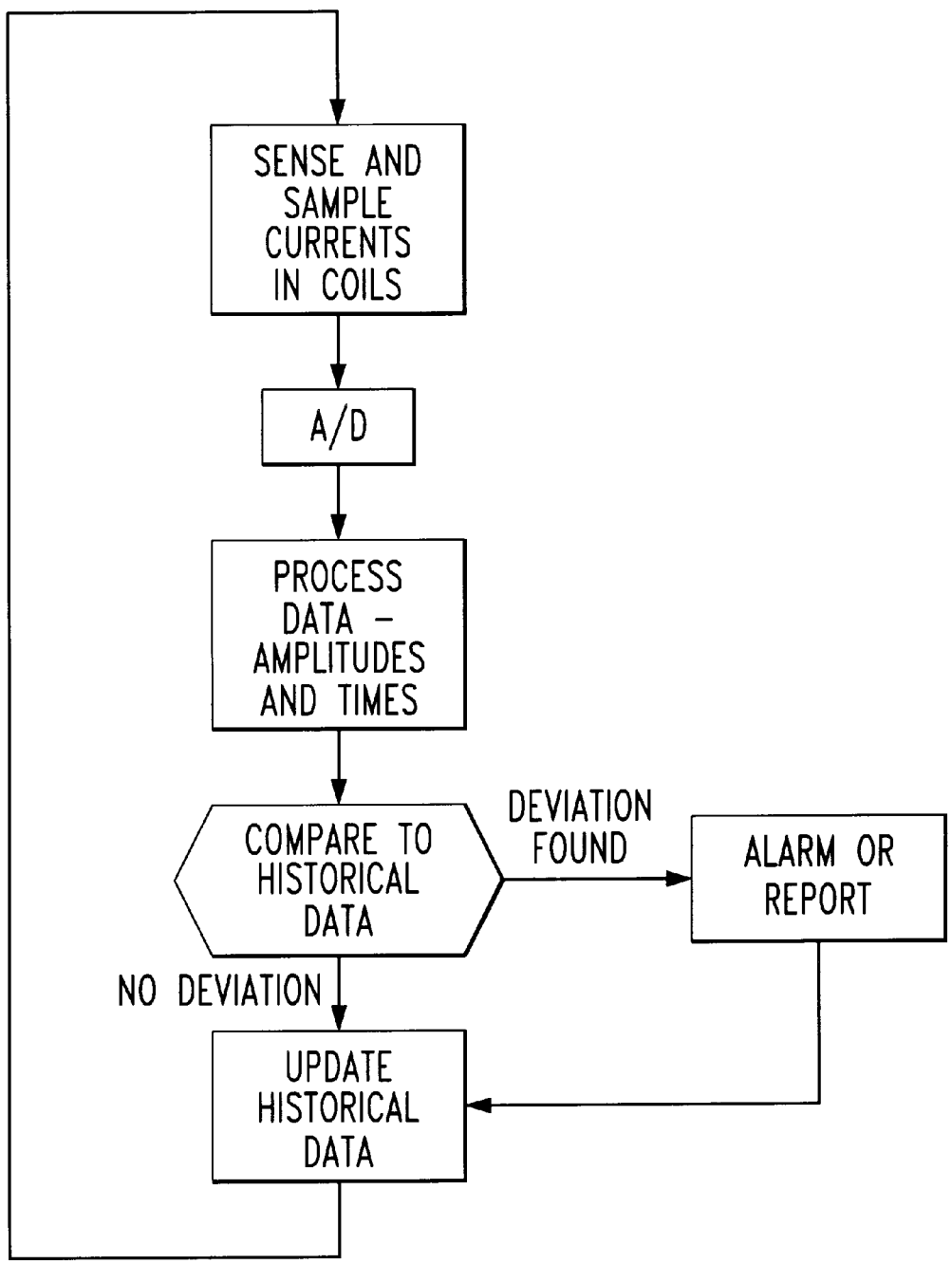
FIG. 7 is a flow chart showing the method steps according to the invention.

During stepping operations, and preferably continuously, the coil current levels to each of the gripper coils 54, 56 and the armature coil 58 are sampled, digitized and stored to provide coil current data samples over time. This is accomplished as shown in FIGS. 6 and 7 using current sensing means to develop a signal representing coil current, which is digitized by an analog to digital converter 74, operated repetitively to collect samples. The coil current data samples can be stored in raw form, and preferably are processed to generate coil current data representing a measure of at least one of: a current amplitude, a time of current variation indicating a change in coil inductance, and an ac ripple. The coil current data is compared to the nominal current amplitudes and timing relationships, and deviations therefrom are identified and indicated to the operators.

For obtaining the samples, each of the coils is coupled to an associated current sensor such as a resistor in series with the coil, an inductor responsive to the coil field, or an inductive loop around the coil, etc. For ac operation, the signal can be coupled through a rectifier and filtered by an RC combination to obtain a voltage signal representing the level of current in the coil. The voltage signal can be sampled via an analog to digital converter triggered by a clock signal from an oscillator, or responsive to a logic device such as a processor 78 programmed repetitively to select and sequentially sample signals developed from a plurality of coils. In the event that a separate clock oscillator (not shown) is associated with the analog to digital converter, or if control computer 78 controls sampling, then a failure of the clock oscillator 76 of the initial timing circuit can be detected by deterioration of timing of the resulting switching operations, detected by computer 78 (or vice versa).

Sampling is preferably accomplished at a frequency of at least ten times the ac power frequency to enable assessment of the extent of ripple in the current signal, which is indicative of the operational status of the power supply (not shown) and the current drivers 62 to the coils (e.g., loading).

The coil current data can be stored in a raw form or processed to develop factors representative of signal attributes, which are then stored in memory 82, or both. The raw data and/or processed attribute factors, generally termed the coil current data, are stored in the computer memory as a historical log, for example on a disk drive. During the collection and processing of data in later cycles, the most recent coil current data is compared to the previous historical coil current data. By sensing for and indicating variations, e.g., exceeding a predetermined threshold of variation, trends occurring over time can be monitored, and impending problems can be predicted.

Referring to FIG. 4, there are certain particular attributes that are advantageously monitored and compared to their historical values. These include the average level of the current signals maintained by the switching controller, the timing of the switching cusps in the signal upon turn-on and turn-off of coil driving current, the extent of ac ripple, the slope of the rising and falling current signal traces, and the occurrence of characteristic notches.

The current waveforms for the stationary and movable gripper coils 54, 56 each contain a readily detectable notch 84 occurring with the mechanical pull-in of the associated gripper, due to increase in inductance, until current drive regulation by driver 62 re-establishes the nominal current level due to feedback control. At the bottom of notch 84, the slope of the current waveform changes direction, which is readily detectable when comparing sample values to immediately preceding sample values, or by calculating a running average or slope of a predetermined number of immediately preceding sample values. The current traces for all the coils have inductive exponential charging and discharging slopes, but likewise have readily detectable transitions between the respective current levels representing turn-on and turn-off. The timing of switching can be identified by comparing each sample to previous values or averages leading up to the level change.

For proper operation, the switch-on edges 86, switch-off edges 88 and gripper pull-in notches 84 must occur at the proper times, namely in the correct sequence and with sufficient spacing in time that earlier needed operations occur and are completed before later operations depending on the earlier ones commence. For example, for stepping upwardly, stationary gripper 44 cannot be released until movable gripper 46 has pulled in, or else the drive rod could drop. Lifting armature 48 cannot be activated until movable gripper 46 has pulled in and stationary gripper 44 is released. By noting the occurrence of the pull-in gripper notches as well as the time spacing between switching operations, the operational status of the control rod drive mechanism can be monitored.

FIG. 7 generally indicates the steps undertaken to obtain and analyze current data repetitively. In the event that comparison of present sample data and historical data shows that a gripper pull-in notch 84 has abruptly begun to occur earlier, the gripper mechanical fittings may be getting loose. If the gripper pull-in notch becomes later, the gripper coil drive arrangement is suspect, or the mechanical fittings may be binding. These attributes can be assessed, as well as the ability of the current drive circuits to maintain predetermined current levels, whether a coil has become open circuited (leading to zero current) or shorted across adjacent windings (reduced inductance and electromagnetic power), etc.

For making these assessments, the nominal and measured current amplitudes, the presence and occurrence of the gripper pull-in notch 84 said notch at nominal and measured delay times and amplitudes following application of a current to the associated gripper coil, are each assessed. The amplitudes and delays as compared to nominal and historical data are used by processor 78 in analyzing the data according to programmed processing steps, to identify mechanical impairment of the gripper, degradation of magnetic flux of the driven coils and in general to assess whether the control rod drive mechanism continues to operate as designed.

Preferably, the current monitoring steps are only one aspect of a monitoring device that is programmed to localize defective or failing components based on the specific results of monitoring. For this purpose, it is advantageous to provide additional measurements apart from the coil currents, for use in conjunction with coil current data to localize problems. By suitably monitoring various status signals, for example using relays or other switched means coupled along the power distribution path from the mains to the coils, problems can be localized to the circuits or elements at which a failure has occurred. For example, a status monitor relay or switching circuit can provide a status input to the apparatus of the invention representing the presence of a signal on each phase of the mains, on the output side of any circuit breakers or similar interrupters coupled to the mains, on the outputs of a regulated power supply that feeds the current regulating circuits and at points in the control and logic circuits that trigger switching.

As noted above, a timing fault in one of clock oscillator 76 driving the timing circuit and the timing reference (e.g., clock) of the processor 78 can be detected from changes in timing. Alternatively, the clock oscillator signal can be digitized together with the current signal, or its cycles counted, to determine whether switch-on edges 86 and switch-off edges 88 occur in correct synchronization with the clock signal. Current or voltage can be sensed at a plurality of points between an ac power source and the control rod drive coils to assess the respective switching devices, power regulators, controllers and the like by monitoring for the presence of current or voltage or for comparing current of voltage levels to nominal levels for identifying electrical or mechanical failure points, whereupon the failure point is logged, made the subject of a warning message or used to trigger an alarm or signal to a remote apparatus.

By monitoring the presence and/or level of voltages and currents, including not only two or more coil current levels but also other voltages such as power supply outputs, and by monitoring the timing of switching operations and the occurrence of notches due to gripper or armature pull-in, it is possible readily to determine and indicate various fault conditions.

In a preferred embodiment, the conditions include:
power cabinet thyristor failure;
power cabinet circuit interrupter operation (e.g., fuse);
power cabinet loss of AC phase;
drive mechanism physical impairment of movement;
drive mechanism coil flux degradation;
controller clock oscillator frequency shift;
controller clock counter malfunction;
controller to power cabinet data transmission error/failure; and,
controller decoder malfunction.

The apparatus of the invention can be embodied in a portable unit for periodic testing or permanently installed as a part of the control rod drive system. In addition, the invention is operable for online diagnostic testing during operations and/or can be part of a larger diagnostic system, for example wherein the apparatus communicates data to a plant diagnostic system or preventive maintenance system.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method for analyzing an electromagnetic drive mechanism for a nuclear control rod while positioning the control rod relative to a core of a reactor for controlling nuclear flux during generation of power by the core, the mechanism having at least one stationary gripper and coil, at least one movable gripper and coil, at least one armature and coil for displacing the movable gripper relative to the stationary gripper, and a timing circuit coupled to a coil current driver operable to provide current to said coils in sequences of operations in which said coils are energized individually and in combinations for advancing and retracting the control rod relative to the core, the method comprising:

positioning the control rod relative to the core of the reactor for controlling said nuclear flux by executing said sequences of operations while:
sensing current signals in said coils during each of said sequences of operations;
sampling and digitizing the current signals of each of said sequences of operations to provide coil current data samples over time;
processing the coil current data samples of each of said sequences of operations to generate coil current data representing a measure of at least one of: a current amplitude, a time of current amplitude variation indicating a change in coil inductance, and an ac ripple;
defining nominal amplitudes and timing relationships for the coil current signals;
storing at least part of the coil current data of each of said sequences of operations as historical data in a historical log; and
comparing the coil current data of each later one of the sequences of operations to said historical data from earlier ones of the sequences of operations and identifying and indicating deviations therefrom occurring over time.

2. The method of claim 1, wherein the current variation comprises a notch occurring upon pull-in of at least one of the stationary gripper and the movable gripper.

3. The method of claim 2, wherein the nominal current amplitudes include occurrence of said notch at a nominal delay and amplitude following application of a current to said at least one of the stationary gripper coil and the movable gripper coil, and further comprising comparing at least one of an actual delay and an actual amplitude of the notch to the nominal delay and amplitude for identifying one of mechanical impairment of the gripper and degradation of a magnetic flux of said at least one of the coils.

4. The method of claim 1, further comprising sensing at least one of current and voltage at a plurality of points between an ac power source and said coils, the points including at least one circuit interrupter, at least one switching device and power regulator, a controller for operating the switching device and the coils, and wherein said current and voltage at the plurality of points are compared to nominal levels for identifying an electrical or mechanical failure point between the power source and the coils, and further comprising indicating said failure point.

5. The method of claim 4, wherein the failure point is determined as at least one of: loss of the ac power source, operation of the circuit interrupter to disengage the ac power source, failure of the switching device, failure of the power regulator and malfunction of the controller.

6. The method of claim 1, wherein the stationary and movable grippers are operable in a grip mode at a higher current amplitude and a hold mode at a lower current amplitude, and further comprising comparing the higher and lower current amplitudes to nominal values.

7. The method of claim 1, further comprising comparing the coil current data of said each later one of the sequences of operations to said nominal amplitudes and timing relationships for the coil current signals.

* * * * *